United States Patent
Blackwell, Jr. et al.

[11] Patent Number: 5,857,191
[45] Date of Patent: Jan. 5, 1999

[54] WEB APPLICATION SERVER WITH SECURE COMMON GATEWAY INTERFACE

[75] Inventors: William C. Blackwell, Jr., Harvard, Mass.; Robin Alston, Penarth, United Kingdom; Kevin M. Farrington, Southborough, Mass.

[73] Assignee: Gradient Technologies, Inc., Marlboro, Mass.

[21] Appl. No.: 676,783

[22] Filed: Jul. 8, 1996

[51] Int. Cl.⁶ .................................................. G06F 17/30
[52] U.S. Cl. ................................ 707/10; 707/1; 707/104; 707/103; 395/200.33; 395/200.45; 395/831; 380/23; 705/35
[58] Field of Search .............................. 707/3, 10, 1, 103, 707/104; 395/200.59, 200.33, 188.01, 684, 200.45, 831; 380/25, 23, 49; 370/401; 705/35

[56] References Cited

U.S. PATENT DOCUMENTS

| | | | |
|---|---|---|---|
| 5,452,459 | 9/1995 | Drury et al. | 707/3 |
| 5,497,463 | 3/1996 | Stein et al. | 395/200.33 |
| 5,673,322 | 9/1997 | Pepe et al. | 380/49 |
| 5,682,534 | 10/1997 | Kapoor et al. | 395/684 |
| 5,689,638 | 11/1997 | Sadovsky | 395/188.01 |
| 5,701,451 | 12/1997 | Rogers et al. | 1/1 |
| 5,706,286 | 1/1998 | Reiman et al. | 370/401 |
| 5,706,349 | 1/1998 | Aditham et al. | 380/25 |
| 5,708,780 | 1/1998 | Levergood et al. | 395/200.59 |
| 5,715,453 | 2/1998 | Stewart | 1/1 |

OTHER PUBLICATIONS

Yew–Huey Liu, Paul Dantzig, C.Eric Wu, Lionel M.Ni, A Distributed connection manager interface for web services on IBM SP systems, IEEE 1996, 2–9, Jun. 1996.

Masud Khandker, Peter Honeyman, Toby J. Teorey, Performance of DCE RPC, IEEE 1995, 2–10, Apr. 1995.

Yew–Huey Liu, Paul Dantzig, C.Eric Wu, Jim Challenger, Lionel M.Ni, A Distributed Web server and its performance analysis on multiple platforms, IEEE, 665–672, May. 1996.

A. Masud Khandker, Toby J Teorey, Case Study: How analytic modeling can reveal performance problems in distributed systems, IEEE, 61–67, Jul. 1996.

Netscape Communications Corporation, "The Netscape Server API," 1995.

Netscape Communications Corporation, "The NSAPI Versus the CGI Interface," 1995.

*Primary Examiner*—Wayne Amsbury
*Assistant Examiner*—Srirama Channavajjala
*Attorney, Agent, or Firm*—Hale and Dorr LLP

[57] ABSTRACT

A web browser communicates through a secure local proxy to a web server that has an interface for secure communications. The application server has an application program conforming to the CGI programming model that can run continuously as a process and can maintain state information, such as pointers to next records, thus requiring less computational and memory overhead for a succession of requests.

13 Claims, 2 Drawing Sheets

WEB APPLICATION SERVER WITH SECURE COMMON GATEWAY INTERFACE

FIELD OF THE INVENTION

This invention relates to a secure interface for an application server.

BACKGROUND OF THE INVENTION

With a commercially available web browser, a user can obtain information, such as a document or records from a database, from a web server over the Internet. The web server can access documents directly, or it can access a database through a common gateway interface (CGI) program. When the web server requests data from the database in response to the user's request, a CGI program is executed to create a query to the database, to format results from the database in HyperText Markup Language (HTML), and to provide the results to the web server for transmission to the user.

To access the database during a succession of requests, the web server creates and executes a separate local CGI program for each request. Each process opens the database, retrieves data specific to the request, and closes the database. Between requests, the web server does not preserve any state information. Consequently, any subsequent request for information from the database requires that a subsequent CGI process perform the same steps, i.e., open database, retrieve data, and close database. Such execution of successive programs for successive requests to access the database is computationally inefficient.

Communications between the web browser and the web server are typically made according to the HyperText Transfer Protocol (HTTP). A concern with such transfers of information is that HTTP is generally not secure. With a commercially available "packet sniffer," an intruder can intercept packets transmitted over the Internet. To provide additional security, public-key authentication and encryption can be added to HTTP. Authentication refers to a mechanism by which the transacting parties prove they are who they claim to be; and encryption refers to the altering of data so that it cannot be easily read or modified if intercepted. Such systems, however, do not provide authorization, i.e., the restriction of access to data based on a user's identity.

To provide more security functions, the web browser and web server can use the Distributed Computing Environment (DCE) from the Open Software Foundation (OSF) of Cambridge, Mass. With a DCE-based system, requests from the web browser are provided to a secure local proxy (SLP), which tunnels the requests to a DCE-aware web server via DCE Remote Procedure Call (RPC). Security based on RPC communications enables authorization in addition to other security features.

OBJECTS AND SUMMARY OF THE INVENTION

It is an object of the present invention to provide access to objects with less computational overhead than is typical of a CGI program model.

It is another object of the present invention to reduce overhead while providing security that includes authentication, privacy, and authorization.

In a system according to the present invention, a secure application server has a secure interface that receives requests from a web browser. The server also has an application program for accessing an object, such as a database, and an application programming interface (API) between the secure interface and the application program.

The secure application server can run continuously as a process and can maintain state information about the object. In the case where the object is a database, the database can remain open between calls to the same database, and the secure server can maintain pointers to next records to be read. This system thus requires less computational and memory overhead. The secure servers are scalable in that additional secure servers can be added and their tasks can be divided so that different servers are used for different purposes. The API between the secure interface and the application program allows a programmer to use the CGI programming model in the application program, without requiring that the programmer program according to the secure interface, such as the Distributed Computing Environment (DCE). Other features and advantages become apparent from the following detailed description, drawings, and claims.

DETAILED DESCRIPTION

Figure 1:
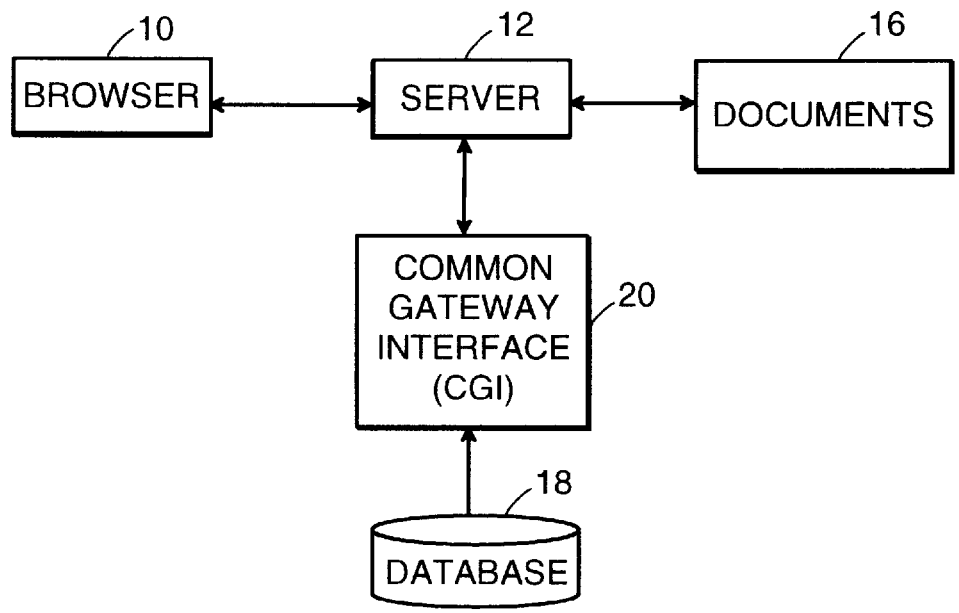
FIGS. 1 and 2 are block diagrams of known systems for providing communications between a web browser and a web server.

Referring to FIG. 1, in a known system, a commercially available web browser 10 (a client) communicates with a web server 12 using HTTP or a version of HTTP with public-key-based authentication and encryption. Web server 12 can access documents 16 directly, or it can cause a process to access data in a database 18 through a common gateway interface (CGI) 20. CGI 20 has a program that resides on server 12 and is customized to server 12 and database 18. CGI 20 is thus part of server 12. For each request from a user for data in database 18, web server 12 executes the CGI program. Each execution of the CGI program causes the server to open database 18, create a query to access the data in the database, provide and format results for server 12 in HTML, and then close database 18.

Figure 2:
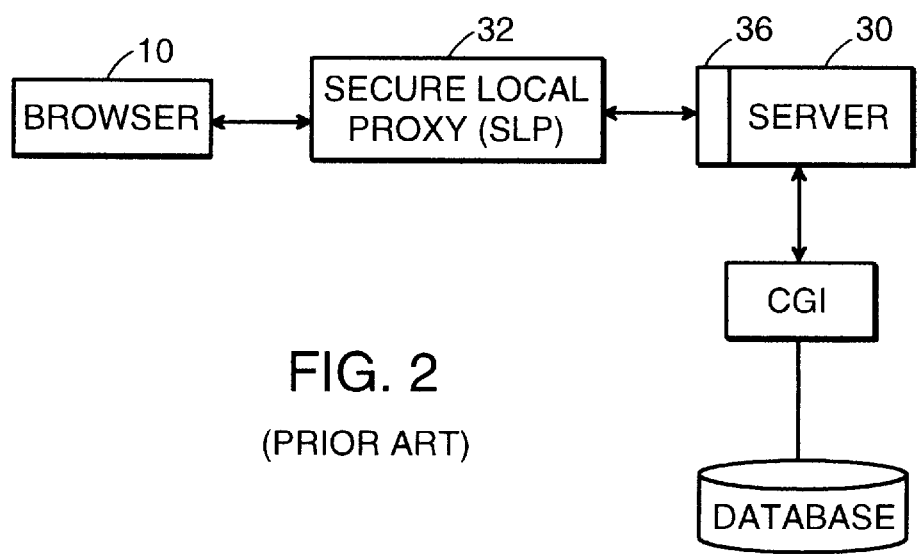

Referring to FIG. 2, to provide enhanced security, the user can use web browser 10 with a secure local proxy (SLP) 32 to communicate with a web server 30 through an interface 36 that allows secure communications with DCE/RPC. Server 30 also uses a CGI program to access a database as described above. While this system provides security that has certain benefits over HTTP or HTTP enhanced with public-key encryption, such as the addition of authorization features, it still has some drawbacks of the system of FIG. 1 in that a stateless CGI program is involved in the same inefficient manner and the CGI program must reside on the same system as server 30 and thus be part of server 30.

Figure 3:
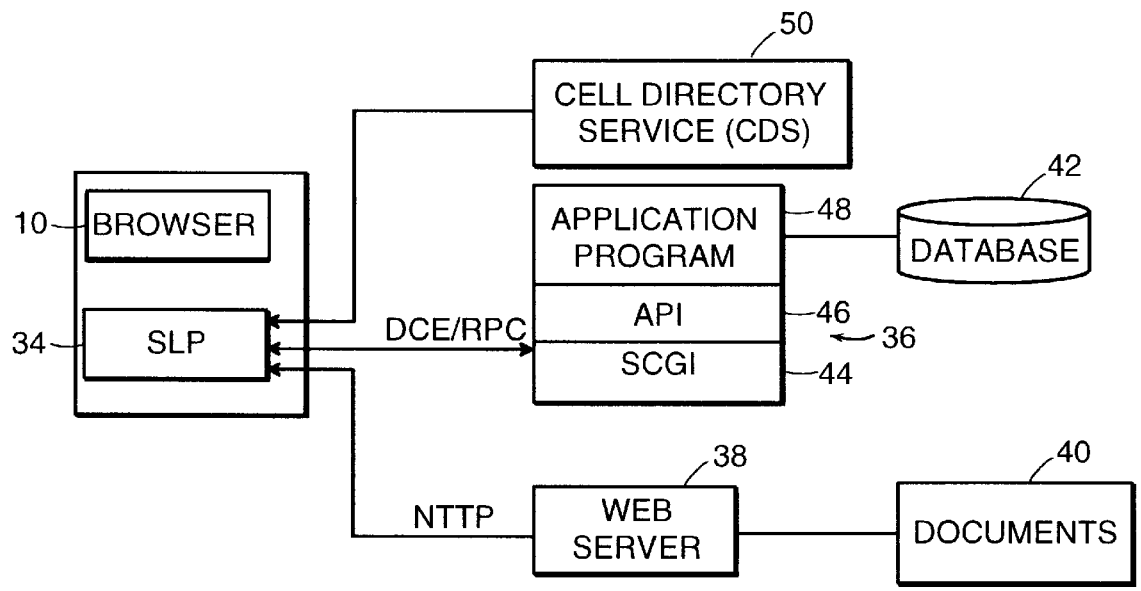
FIGS. 3 and 4 are block diagrams of systems according to embodiments of the present invention.

Referring to FIG. 3, according to the present invention, a web browser 10 can communicate with many web servers, including an application server 36 through an SLP 34 over secure DCE/RPC, and with web server 38 with HTTP. Server 38 can retrieve documents 40 and provide them to the user over non-secure HTTP.

Server 36 has a secure interface 44 that supports communications with secure DCE/RPC, an application programming interface (API) 46, and an application program 48 that can access an object such as a database 42. Program 48 in server 36 can be kept constantly running with the database open. With this ability, program 48 can maintain state information about database 42, and can store database-specific handles to service a series of database queries without closing the database between each query. These handles can contain pointers that allow a next record to be retrieved without restarting a search. Server 36 can thus omit computational overhead that is typically required for a series of accesses as in a system such as that shown in FIG. 1. To implement this feature, the server has a main procedure which calls a database open routine, thus causing the database to remain open.

Server 36 is also multi-threaded so that it can handle requests from multiple browsers concurrently, thus providing additional computational efficiency over the typical CGI-based system. The shared process memory also requires less memory.

As part of a typical DCE system, the system shown in FIG. 3 has a cell directory service (CDS) 50 that runs as a daemon on some host in the DCE cell. CDS 50 brings together DCE-based clients, such as SLP 34 and secure application servers 36. If a user with a web browser invokes a Uniform Resource Locator (URL) with a particular DCE syntax (e.g., "/.:/" in the URL), SLP 34 queries CDS 50 to determine the network location of a DCE-aware web server corresponding to the URL. Because the URL locates a virtual object within the network and not a specific network host or a hard physical network address, a secure application server can change its host name or network address and re-register with the CDS 50 daemon without requiring a change in the URL invoked by the client user.

Figure 4:
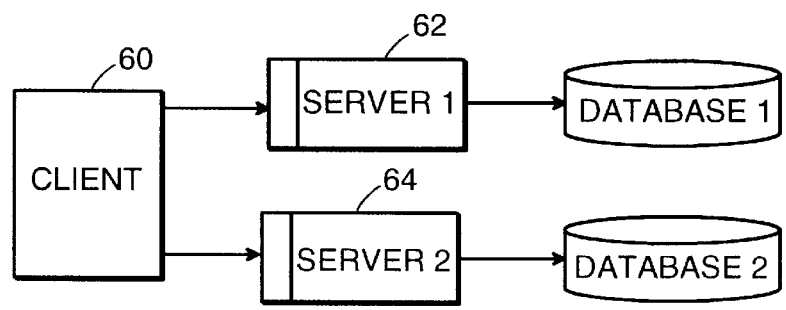

Referring to FIG. 4, the system of the present invention is easily scalable in that a client 60 can access multiple secure application servers 62, 64 such that each secure application server corresponds to a different URL and a different application or group of applications. For example, different secure application servers can each access different databases, each feeding information back to the web browser; or one application server can be a backup in the event that one host fails.

Referring again to FIG. 3, application program 48 can be written by a programmer to conform to the model and protocol used with current CGI-based servers, but program 48 is adapted for use with secure interface 44 with a toolkit in API 46 that implements the secure interface functions. This toolkit includes a library with a number of routines for handling details associated with the secure interface protocol and provides a convenient interface to the user/programmer, without requiring the programmer to program with a secure interface protocol such as DCE.

The toolkit has a "start" routine that initializes functions of the application server, such as providing a server name to CDS 50 so that the server can be found, and registering an end point. After the server is started, a "listen" routine causes the application server to listen for incoming requests. This listen routine accepts, as input parameters, pointers to handler routines for HTTP methods that might be requested by a client user, such as "GET," "HEAD," "POST," and "PUT" methods. These handler routines would be written by an application developer with an application-specific procedure for handling requests. These handlers typically take input parameters, check authorization against an access control list (ACL), perform processing, create HTML output, and return to the listen routine. If the toolkit is written in C-language, it also includes input/output routines that emulate known C-language runtime routines, such as printf, puts, getc, and getenv.

With this toolkit stored as API 46 on application server 36 in one of a number of known types of storage media, such as a disk, application programmers familiar with CGI programming can build an application server of the type shown in FIG. 3, while the toolkit conveniently adapts the CGI program to the secure interface.

An embodiment of a secure interface and an application program interface is available from Gradient Technologies, Inc., of Marlboro, Mass., under the name WebCrusader Secure AppEngine. This product provides DCE-based communications for users with a WebCrusader Connect Client local proxy and also provides a C-language API for communicating with an application program. With such a system, the application server is not tied to another particular web server. Because the application server is not tied to a particular web server, it can be managed separately, thus making administration more manageable. Moreover, the application program for accessing the object can be written in the known CGI form, and therefore the programmer need not use a proprietary protocol.

Having described an embodiment of the present invention, it should be apparent that other modifications can be made without departing from the scope of the invention as defined by the appended claims. While the present invention has been described in terms of DCE, other secure systems, such as a public key system, could be employed.

What is claimed is:

1. An application server for receiving from a web browser requests to access an object, the server comprising:
    a secure interface for receiving the requests from the web browser over a communications line;
    an application program conforming to the common gateway interface (CGI) protocol and stored in a storage medium for accessing the object and for providing data as a result of the access; and
    an application program interface with a library of routines stored in a storage medium for communicating between the application program conforming to the CGI protocol and the secure interface to provide secure communications to the object.

2. The server of claim 1, wherein the secure interface receives communications with Distributed Computing Environment Remote Procedure Call (DCE RPC).

3. The server of claim 1, wherein the application program has an open database call to keep the object open between successive requests from the web browser.

4. A method comprising server-implemented steps of:
    receiving over the Internet from a web browser a first request for access to a database;
    accessing the database in response to the first request according to the CGI protocol;
    providing data from the database to the web browser according to the CGI protocol without closing the database;
    receiving over the Internet from a web browser a second request for access to a database;
    accessing the non-closed database according to the CGI protocol in response to the second request from the web browser; and
    providing data from the database to the web browser according to the CGI protocol in response to the second request.

5. The method of claim 4, wherein the receiving steps include receiving requests over DCE RPC.

6. A system responsive to requests from a user with a web browser, the system comprising:

a web server having an interface for allowing secure communications between the server and the web browser, the web server for providing documents to the web browser;

a first object accessible over the Internet; and a first application server with a secure interface that allows secure communications of the type provided by the web server, the first application server being responsive to the web browser for accessing the first object to retrieve data therefrom and for providing the retrieved data to the web browser independent of the web server.

7. The system of claim 6, further comprising a second object accessible over the Internet, and a second application server having a secure interface and being responsive to the web browser for accessing and retrieving data from the second object independent of the web server.

8. The system of claim 6, wherein the first web server is a DCE-aware server and the secure interface supports DCE.

9. The system of claim 6, further comprising a cell directory service, responsive to a request from the client, for determining a network location of a requested server.

10. The system of claim 6, wherein the application server is multi-threaded.

11. The system of claim 6, wherein the accessible object is a database, and the application server is programmed to access the database during multiple requests without closing the database between requests.

12. The system of claim 6, wherein the first accessible object is a database, and wherein the application server has an application program for accessing the database, and an application programming interface for communicating between the application program and the secure interface.

13. The system of claim 12, wherein the application program conforms to the CGI protocol, and the secure interface supports DCE.

\* \* \* \* \*